July 29, 1969     E. MATTHEWS     3,458,027
RETARDING PULLEY ASSEMBLY FOR GRAVITY CONVEYOR
Filed Oct. 27, 1967     2 Sheets-Sheet 1
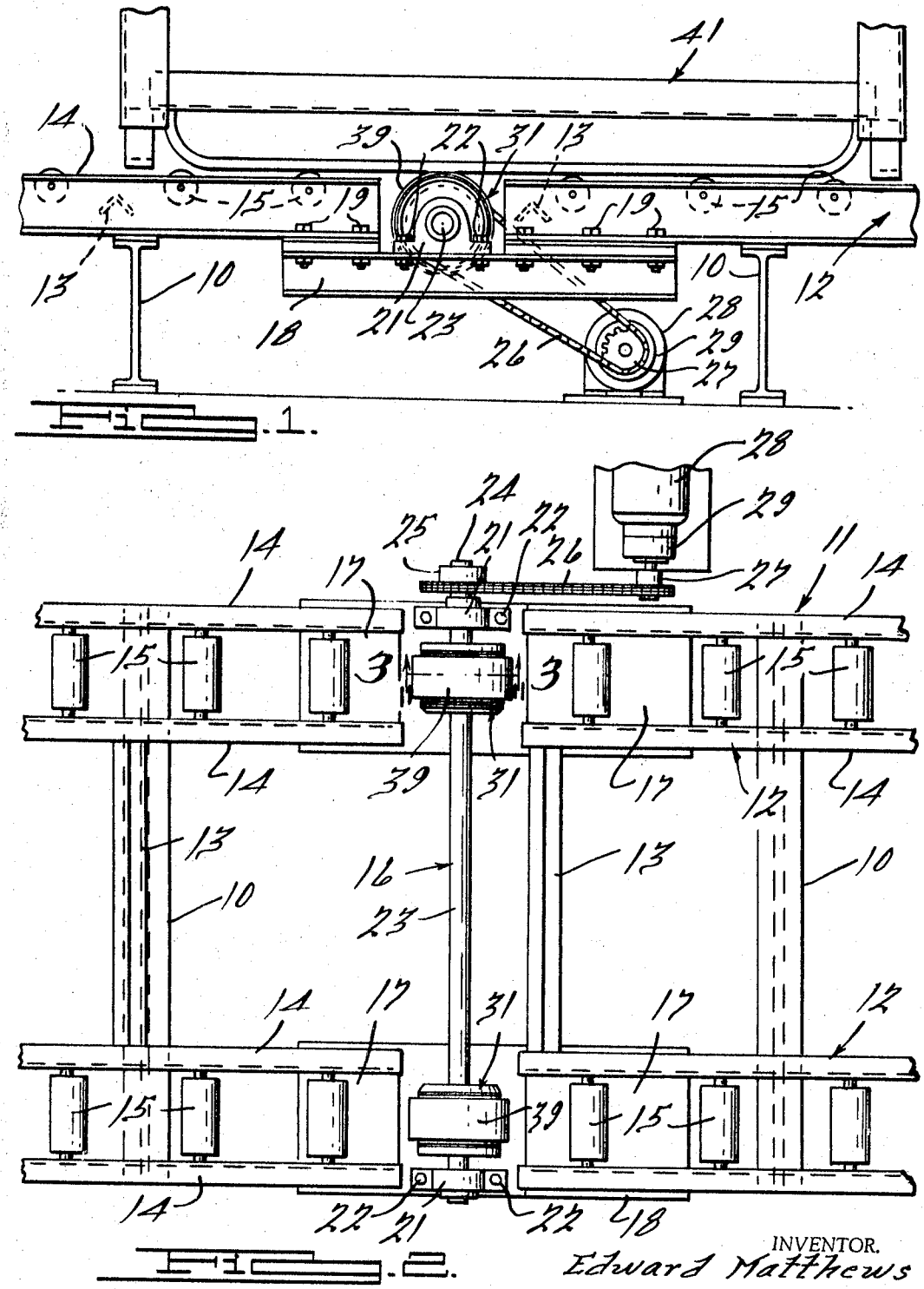
INVENTOR.
Edward Matthews
BY
Harness, Dickey & Pierce
ATTORNEYS.

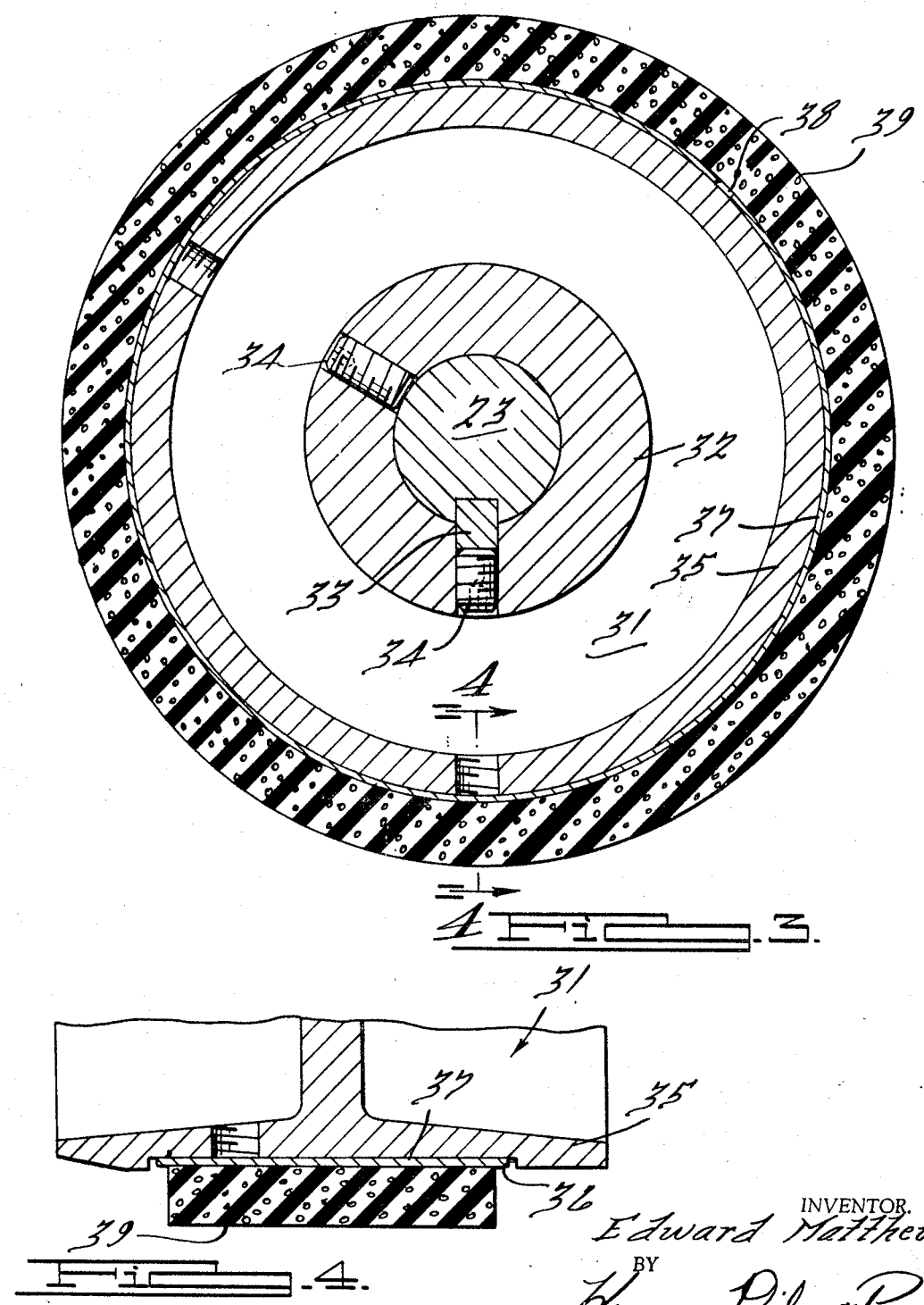

United States Patent Office 3,458,027
Patented July 29, 1969

3,458,027
RETARDING PULLEY ASSEMBLY FOR
GRAVITY CONVEYOR
Edward Matthews, Arcadia, Calif., assignor to Fruehauf
Corporation, Detroit, Mich., a corporation of Michigan
Filed Oct. 27, 1967, Ser. No. 678,629
Int. Cl. B65g 13/00, 13/075
U.S. Cl. 198—127                                   7 Claims

ABSTRACT OF THE DISCLOSURE

When a load is moved along a roller type gravity conveyor, it may pick up speed and move faster than desired. Retarding pulleys are mounted on a shaft in the conveyor and driven by a motor at a predetermined speed to slow up the load by an overrunning braking action between the periphery of the pulleys and the hubs thereof as the load advances thereover.

Background of the invention

No knowledge is had concerning the use of a drive means in a conveyor which advances a load and which applies an overrunning braking force to the load to retard its advancement when moving too fast.

Summary of the invention

A gravity type roller conveyor has sloping spaced supports containing rollers on which a load advances by gravity. Driven pulleys are mounted in alignment with the rollers with their peripheral surfaces extending above those of the rollers. The pulleys are mounted on a shaft and driven at a predetermined peripheral speed from a motor through reduction gearing. The peripheral flange of the pulleys has a groove in which a rolled hard sheet of brass or like metal is placed in contact with the cast iron surface at the bottom of the groove. A tube-type of rubber sleeve is cemented to the outer surface of the brass strip having an overall diameter to extend above the surfaces of the rollers of the conveyor so as to be frictionally engaged by the load when passing down the conveyor. The peripheral speed of the rubber sleeve is such as to drive the load at a predetermined speed. Should the load be moving faster than the predetermined speed the frictional engagement with the rubber sleeve will cause the sleeve and brass strip to overrun the pulley surface and produce a braking action between the surface of the brass strip and the engaged cast iron surface of the pulley. This produces a retarding action to the advancement of the load and slows it down to the predetermined driving speed of the rubber sleeve which produces the advancement of the load at the predetermined speed.

Brief description of the drawings

FIGURE 1 is a broken view in side elevation of a gravity conveyor having rollers on which the load advances shown in engagement with the peripheral surface of retarding pulleys of the present invention.

FIGURE 2 is a plan view of the structure illustrated in FIG. 1;

FIG. 3 is an enlarged sectional view of the structure illustrated in FIG. 2, taken on the line 3—3 thereof, and FIG. 4 is a sectional view of the structure illustrated in FIG. 3, taken on the line 4—4 thereof.

Description of the preferred embodiment

A conveyor system 11 comprises spaced frames 12 which are joined together by angle members 13. The frames consist of a pair of outwardly presenting channel elements 14, the webs of which support rollers 15 with their peripheral surfaces disposed thereabove. The frames are suitable supported on I-beams 10 from the floor to slope from right to left to provide a gravity feed to a load which advances on the rollers. A section of the frames 12 is omitted where a speed retarding device 16 is to be located. The space ends of the frame are connected by a plate 17, joined to the bottom flanges of the channel elements 14 and to a pair of connecting channel elements 18 by bolts 19. Pulley blocks 21 are secured to the plates 17 and the upper flange of the channel elements 18 by bolts 22. A shaft 23 is mounted in the pulley blocks 21 having an end 24 extending therebeyond for supporting a sprocket wheel 25. The sprocket wheel 25 is driven by a chain 26 from a sprocket wheel 27 on a motor 28 containing a reduction gear unit 29.

A pulley 31 is fixed to the shaft inwardly of each of the pulley blocks 21 in alignment with the rollers 15. As illustrated in FIGS. 3 and 4, the pulley has a hub 32 which is fixed to the shaft 23 by a key 33 and set screws 34. A peripheral rim 35 of the pulley 31 contains a groove 36 in which a cylindrical strip 37 is disposed in frictional engagement with the bottom surface of the groove of the pulley which is preferably constructed of cast iron. The ends of the cylindrical strip 37 are spaced slightly apart as at 38 to permit the cylindrical strip to be snapped over the rim 35 into the groove 36 and tightly engage the groove surface. A tube-type rubber sleeve 39 is stretched over the cylindrical strip 37 and is bonded to the outer surface thereof. The diameter of the sleeve 39 is such as to extend above the peripheral surface of the rollers 15 so as to firmly engage the load as it moves into engagement therewith from the rollers. If the load, such as a frame 41, moves downwardly on the conveyor on the rollers 15, it will contact the rubber sleeves 39 and be driven ahead when moving too slowly on the conveyor. If, however, the frame accelerates during its movement on the rollers above a predetermined speed, its engagement with the sleeve 39 will cause the sleeve 39 and the cylindrical strip 37 to overrun the rim 35 and the frictional engagement between the cylindrical strip 37 and the cast iron surface of the hub will produce a braking action and slow down the frame 41 to the speed of the sleeve 39 by the time it advances beyond the pulleys 31.

The cylindrical strip 37 is preferably made from a hard sheet of brass, one, for example, having approximately 70% copper and 30% zinc which will produce the braking force with the cast iron surface without undue wear. The friction between the rubber and the load will be far greater than that between the brass cylindrical strip 37 and the surface of the surface of the groove 36 so that the relative movement will occur between the surface of the groove and that of the cylindrical strip 37 to thereby produce the retarding or braking action. If the velocity of the load is less than that of the periphery of the sleeve 39, the speed of the load will be increased to the predetermined speed by the driven pulleys and when the velocity of the load is greater than that of the sleeve 39, a braking force will result which will reduce the velocity of the load to the predetermined speed.

It is to be understood that any number of retarding devices may be inserted in a conveyor depending upon the length thereof and the amount of slope thereto. It is within the purview of the invention to employ a single frame 12 and a single pulley 39 when a narrow conveyor is to be employed.

What is claimed is:

1. In a gravity type conveyor, a sloping frame having rollers, a pulley having a hub and peripheral rim, a shaft mounting said pulley on said frame in alignment with the rollers, motor means for driving said shaft and pulley at a predetermined speed, a sleeve of elastomeric material on the outer surface of said rim has its periphery extending above the peripheral surface of the rollers, and brake means on the pulley between the sleeve and shaft which permits the sleeve to overrun the shaft while providing a driving and braking force thereto.

2. In a gravity type conveyor as recited in claim 1, wherein the periphery of the rim has a groove, a cylindrical strip in said groove, and a rubber sleeve secured to said strip and extending above said rim.

3. In a gravity type conveyor as recited in claim 2, wherein a plurality of conveyors are spaced apart and a plurality of pulleys are mounted on the shaft in alignment with the rollers on each conveyor.

4. A pulley having a hub and a peripheral rim containing a groove, a band of braking material located in said groove, and a sleeve of elastomeric material on said band which is advanced in the groove when the sleeve overruns the pulley and which is driven through the band when the sleeve tends to underrun the pulley.

5. A pulley as recited in claim 4, wherein the band has a transverse slot with the ends disposed in spaced relation to each other.

6. The method of controlling the speed of a load on the rollers of a gravity type conveyor which includes the steps of: driving an elastomeric sleeve on a cylindrical strip in a groove in the rim of a pulley through the frictional engagement between the surfaces of the cylindrical strip and the groove when the speed of the load is to be increased, and providing a braking force between the surfaces when the speed of the load is to be reduced while the pulley is being driven.

7. The method of controlling the speed of a load as recited in claim 6, wherein the frictional engagement between the cylindrical strip and pulley is less than that between the elastomeric sleeve and the load.

References Cited

UNITED STATES PATENTS 2,627,969 2/1953 Darner et al. _____ 198—127
2,769,515 11/1956 Thomas et al.

EVON C. BLUNK, Primary Examiner

DOUGLAS D. WATTS, Assistant Examiner

U.S. Cl. X.R.
193—35, 40